(12) United States Patent
Kinoshita et al.

(10) Patent No.: US 8,624,170 B2
(45) Date of Patent: Jan. 7, 2014

(54) INVERTER CONTROLLER AND HIGH-FREQUENCY DIELECTRIC HEATING APPARATUS

(75) Inventors: Manabu Kinoshita, Nara (JP); Haruo Suenaga, Osaka (JP); Kenji Yasui, Nara (JP); Shinichi Sakai, Nara (JP); Nobuo Shirokawa, Nara (JP); Hideaki Moriya, Nara (JP)

(73) Assignee: Panasonic Corporation, Osaka (JP)

( * ) Notice: Subject to any disclaimer, the term of this patent is extended or adjusted under 35 U.S.C. 154(b) by 1418 days.

(21) Appl. No.: 12/305,242

(22) PCT Filed: Jun. 5, 2007

(86) PCT No.: PCT/JP2007/061388
§ 371 (c)(1),
(2), (4) Date: Dec. 17, 2008

(87) PCT Pub. No.: WO2007/148527
PCT Pub. Date: Dec. 27, 2007

(65) Prior Publication Data
US 2009/0206073 A1 Aug. 20, 2009

(30) Foreign Application Priority Data
Jun. 19, 2006 (JP) ................................. 2006-169052

(51) Int. Cl.
*H05B 6/66* (2006.01)
*H05B 6/68* (2006.01)

(52) U.S. Cl.
USPC ............................ 219/715; 219/716; 219/702

(58) Field of Classification Search
USPC ......... 219/714–716, 660–705, 764–765, 710, 219/720–721, 601, 626–627; 363/20, 21, 363/131; 361/18, 94, 103, 704; 315/207, 315/223, 283
See application file for complete search history.

(56) References Cited

U.S. PATENT DOCUMENTS

| | | | |
|---|---|---|---|
| 5,268,547 A * | 12/1993 | Bessyo et al. | 219/716 |
| 7,312,427 B2 | 12/2007 | Suenaga et al. | |
| 8,207,478 B2 * | 6/2012 | Tian et al. | 219/704 |
| 2004/0238530 A1 | 12/2004 | Nonaka et al. | |
| 2004/0240898 A1 * | 12/2004 | Nonaka et al. | 399/33 |

FOREIGN PATENT DOCUMENTS

| | | |
|---|---|---|
| JP | 2001-238466 A | 8/2001 |
| JP | 2004-266890 A | 9/2004 |
| JP | 2004-327123 A | 11/2004 |

OTHER PUBLICATIONS

JP2001-238466A Translated on Dec. 7, 2012, System Interconnection Inverter Device http://dossier1.ipdl,inpit.go.jp/cgi-bin/tran__web_cgiejje.*
International Search Report for PCT/JP2007/061388; Jul. 5, 2007.

* cited by examiner

*Primary Examiner* — Quang Van
(74) *Attorney, Agent, or Firm* — Pearne & Gordon LLP

(57) ABSTRACT

An inverter controller controls an inverter. The inverter converts direct current into alternating current of a predetermined frequency. The inverter includes a resonance circuit for fluctuating output of a predetermined object to be controlled. The inverter controller comprises an output fluctuating unit which fluctuates output of the inverter in response to an output value of a temperature detection section which detects a temperature of a switching element of the inverter. The inverter controller further comprises an output increase suppressing unit which suppresses an increase in the output of the inverter for a predetermined time after decrease control in the output of the inverter performed by the output fluctuating unit.

8 Claims, 8 Drawing Sheets

INVERTER CONTROLLER AND HIGH-FREQUENCY DIELECTRIC HEATING APPARATUS

TECHNICAL FIELD

This invention relates to high-frequency dielectric heating using a magnetron like a microwave oven and, in particular, to overheat protection for semiconductor switching elements used in an inverter and prevention of overvoltage applied to the magnetron.

BACKGROUND ART

Hitherto, in a high-frequency dielectric heating apparatus using a magnetron such as a microwave oven, electric power supplied to the magnetron has been adjusted based on the pulse width of output signal from an inverter controller. To increase the output power, the pulse width of the output signal form the inverter controller has been widened, thereby increasing the electric power supplied to the magnetron. This configuration makes it possible to continuously change heat output of the magnetron.

FIG. 6 is a block diagram including a magnetron used in a high-frequency dielectric heating apparatus in a prior art. In FIG. 6, alternating current from a commercial power supply 11 is rectified to direct current by a rectifier 13 and the direct current is smoothed through a choke coil 14 on the output side of the rectifier 13 and a smoothing capacitor 15 and is given to the input side of an inverter 16. The direct current is converted into any desired high frequency (20 to 40 kHz) by turning on/off a semiconductor switching element, IGBT (Insulated Gate Bipolar Transistor) in the inverter 16. The inverter 16 includes IGBT 16a for switching the direct current at high speed and a capacitor 16b and is driven by an inverter controller 161 for controlling the inverter 16 to switch on/off electric current flowing through the primary side of a boosting transformer 18 at high speed.

In the boosting transformer 18, high-frequency voltage output by the inverter 16 is applied to a primary winding 181 and a high voltage responsive to the turns ratio is obtained at a secondary winding 182. A winding 183 with a smaller number of turns is provided on the secondary side of the boosting transformer 18 and is used to heat a filament (heater, cathode) 121 of a magnetron 12. The secondary winding 182 of the boosting transformer 18 includes a voltage-doubling rectifier 20 for rectifying output of the secondary winding. The voltage-doubling rectifier 20 is made up of high voltage capacitors 201 and 202 and two high voltage diodes 203 and 204.

A thermistor 9 for detecting the temperature of the IGBT 16a is attached directly to a leg part of the IGBT 16a or the proximity of the leg part. The leg part is an emitter leg and a chip (chip thermistor) forming the thermistor is soldered on the solder face of the back of a printed board 6 (FIG. 7) rather than the radiation fin side. Temperature information provided by the thermistor is input to the inverter controller 161 and is used to control the inverter 16.

FIG. 7 shows the printed board 6 on which a radiation fin 7, the IGBT 8 (16a), and the thermistor 9 are placed. The heating part of the IGBT 8 for generating high heat is fixed to the radiation fin 7 and three legs are inserted into through holes of the printed board and are soldered on the opposite side (back, solder side). The chip thermistor is used as the thermistor 9 and is soldered directly to the legs of the IGBT 16a on the solder face of the back of the printed board 6 rather than the radiation fin side.

In the configuration, a method of preventing thermal destruction of the IGBT for switching the inverter power supply, so-called power down control of stopping or powering down before thermal destruction of the IGBT to prevent a temperature rise is executed. An outline of the power down control is as follows:

(1) When the IGBT temperature reaches a detection temperature, first the power is decreased to a first predetermined value (for example, about a half) without suddenly turning off the power. Then, when the IGBT temperature lowers and falls below the detection temperature, again the power is restored to predetermined power and when the IGBT temperature rises and again reaches the detection temperature, again powering down is performed. This operation sequence is repeated for keeping the detection temperature.

(2) A given control width signal is always given from a microcomputer, and in the inverter, the thermistor detects the temperature of the IGBT and sends a detection value to the inverter controller for controlling the inverter so as to lower the temperature of the IGBT.

(3) The thermistor is previously inserted into one of partial pressure circuits and gradual decrease control is performed based on the partial pressure ratio when the thermistor detects overheat temperature.

(4) When the gradual decrease control reaches at a certain point in time, the target value is largely decreased and this control is repeated. One cycle of the gradual decrease control is about one to two seconds at shortest. Such control is made possible by lessening a heat time constant as the chip thermistor is provided on the terminal back of the IGBT as described above.

Therefore, even when a foreign substance is caught in a fan for some reason and the fan abruptly stops, immediately cooking is stopped. In the configuration, however, attention is focused on the fact that thermal destruction of the IGBT does not easily occur if the fan fails, and cooking is allowed to continue. When the temperature of the IGBT rises and reaches a temperature before the temperature at which thermal destruction of the IGBT occurs, then the power is decreased to about a half and heating is allowed to continue. In such control, if the cooking is ordinarily performed, the user feels that warming is a little slow, and can be allowed to continue cooking without feelings of anxiety of a failure; mental anxiety can be circumvented.

Similar comments are also applied when the fan is locked; the heating operation can be allowed to continue at the minimum output to such an extent that the IGBT is not thermally destroyed without shutting down the power.

FIGS. 8A and 8B are drawings to describe the power down control system described above; FIG. 8A is a circuit diagram and FIG. 8B is a timing chart showing the operation of a comparator.

In FIG. 8A, the potential at a point P3 provided by dividing the collector voltage of IGBT using partial pressure resistors R3 and R4 is input to a (A) terminal of one of two input terminals of a comparator CO1 and during starting, a changeover switch S1 is at the position of an a terminal and 3 V is applied to the other (C) terminal. When a magnetron heats and enters a stationary state (stationary operation) from the starting, the changeover switch S1 switches to the position of a b terminal and the potential at a Pc point provided by dividing Vcc voltage using a partial pressure resistor R1 and a thermistor T1 (reference numeral 9 in FIGS. 6 and 7) is input.

Since the thermistor T1 has a characteristic that the resistance value decreases with a temperature rise, when the detection temperature of the thermistor is a predetermined value, the collector voltage gradually decreases from the point like (C) in FIG. 8B. During the starting, the inverter controller 161 controls the ON/OFF duty of the IGBT so that the P3 potential roughly matches 3 V based on ON/OFF information of the comparator CO1 and thus the collector voltage of the IGBT becomes lower than that at the stationary time. When the stationary state is entered, sufficiently high Pc potential as compared with 3 V at the starting time is input to the (C) terminal of the comparator CO1. Therefore, the inverter controller 161 increases the ON duty of ON/OFF control of the IGBT so that the P3 potential (A) roughly matches the Pc potential (C), and the collector voltage of the IGBT also increases. However, although not shown in the figure, a limitation is imposed on the rise in the ON duty mentioned above by a power control function of controlling based on another input signal, included in the inverter controller 161 and thus the Pc potential (C) always becomes higher than the P3 potential (A) and output of the comparator CO1 is maintained on at all times, as shown in FIG. 8B. However, since the resistance of the thermistor T1 decreases with heating of the IGBT because of cooling shortage, etc., when the Pc potential (C) becomes the same as the P3 potential (A), again ON/OFF is started. The inverter controller 161 decreases the ON duty of ON/OFF control of the IGBT so that the P3 potential (A) decreases following the decrease in the Pc potential (C) and thus output of the inverter decreases.

Thus, in the power down control, the inverter section starts the magnetron and after the stationary state is entered, output voltage of the inverter section is made to depend on the resistance value of the thermistor and thus if the fan does not rotate for some reason, the inverter section is allowed to continue the operation without shutting down the power. As the temperature of the IGBT rises, the resistance value of the thermistor decreases and output of the inverter decreases, so that the user can continue cooking with such a feeling that the heating temperature is a little low.

Patent document 1: JP-A-2004-327123

DISCLOSURE OF THE INVENTION

Problems to be Solved by the Invention

The power down control described above makes it possible to continue cooking under a given condition without suddenly stopping the cooking, and the usability of the high-voltage dielectric heating apparatus improves for the user. However, when the temperature later falls and the usual operating state is made possible, if the inverter controller again increases output of the magnetron, a so-called moding phenomenon or overshoot occurs and the inverter-control may stop. This is because if the output of the magnetron is increased from low output under the power down control to usual output, the filament becomes open or a state close to open and the moding phenomenon may occur, so that an overvoltage may be applied.

Considering the circumstances described above, the present invention provides an art for more improving the reliability and the usability of a high-voltage dielectric heating apparatus.

Means For Solving the Problems

An inverter controller of the present invention is an inverter controller for controlling an inverter which converts direct current into alternating current of a predetermined frequency, and includes a resonance circuit for fluctuating output of a predetermined object to be controlled, the inverter controller including: an output fluctuating unit which fluctuates output of the inverter in response to an output value of a temperature detection section which detects a temperature of a switching element of the inverter; and an output increase suppressing unit which suppresses an increase in the output of the inverter for a predetermined time after decrease control in the output of the inverter performed by the output fluctuating unit.

According to the present invention, the output increase suppressing unit prevents an abrupt rise of output after power down control, so that it is made possible to improve the reliability and the usability of an apparatus incorporating the inverter controller, such as a high-frequency dielectric heating apparatus.

The output increase suppressing unit may also perform stationary transition control at the time of making a transition from start of the object to be controlled to a stationary state. According to the configuration, output increase suppressing control can be easily performed.

The output increase suppressing unit includes a capacitor for storing charge for a predetermined time to suppress the increase in the output of the inverter performed by the output fluctuating unit. Further, the output increase suppressing unit promptly activates the decrease control in the output of the inverter independently of a time constant of the capacitor at the decrease control in the output of the inverter. According to the configuration, power down control and output increase suppressing control can be easily performed.

The output fluctuating unit increases the output of the inverter in response to potential of the capacitor after the output increase suppressing unit suppresses the increase in the output of the inverter for a predetermined time. According to the configuration, power down control and output increase suppressing control can be easily performed.

Further, an inverter controller of the present invention is an inverter controller for controlling an inverter which converts direct current into alternating current of a predetermined frequency, and includes a resonance circuit for fluctuating output of a predetermined object to be controlled, in response to an output value of a temperature detection section which detects a temperature of a switching element of the inverter, the inverter controller including: a temperature state output section which outputs a first state signal in response to the output value of the temperature detection section; a voltage fluctuating section which fluctuates resonance voltage occurring in the resonance circuit; and an output increase delay section which outputs a rise signal for causing the voltage fluctuating section to raise the resonance voltage after a predetermined time from input of the first state signal if the first state signal is a signal for raising the resonance voltage.

According to the present invention, the output increase delay section prevents an abrupt rise of output after power down control, so that it is made possible to improve the reliability and the usability of an apparatus incorporating the inverter controller, such as a high-frequency dielectric heating apparatus.

When making a transition from start of the object to be controlled to a stationary state, the output increase delay section is connected to the voltage fluctuating section to control the resonance voltage. According to the configuration, output increase suppressing control can be easily performed.

The output increase delay section includes a capacitor for storing charge for a predetermined time to output the rise signal to the voltage fluctuating section. Further, the output increase delay section promptly activates decrease control in output of inverter independently of a time constant of the capacitor at the decrease control in the output of the inverter.

According to the configuration, power down control and output increase suppressing control can be easily performed.

The output increase delay section increases output of the inverter in response to potential of the capacitor after suppressing the increase in the output of the inverter for a predetermined time. According to the configuration, power down control and output increase suppressing control can be easily performed.

The temperature state output section outputs a second state signal to the voltage fluctuating section in response to the output value of the temperature detection section, and wherein the first state signal and the second state signal indicate different temperature states of the temperature detection section from each other. Such control is performed, whereby if the temperature of the switching element further rises, the inverter can be controlled appropriately.

The inverter controller controls the resonance voltage of the resonance circuit. The resonance voltage may be equal to the collector-emitter voltage of the switching element of the inverter.

The inverter controller can be used for a high-frequency dielectric heating apparatus having a magnetron as the object to be controlled.

Further, the present invention provides a high-frequency dielectric heating apparatus for heating an object to be heated by irradiation with a microwave and the apparatus includes an inverter which performs switching control of direct current using a switching element to convert the direct current into alternating current of a predetermined frequency; a radiation fin which radiates heat released from the switching element; a thermistor which detects a temperature of the switching element; a printed board with the switching element and the thermistor mounted thereon; a boosting transformer which boosts output voltage of the inverter; a high voltage rectifying section which performs voltage-doubling rectification of output voltage of the boosting transformer; a magnetron which radiates output of the high voltage rectifying section as the microwave; a heating chamber which receives supply of the microwave radiated from the magnetron and stores the object to be heated; and an inverter controller which performs power down control for the switching element for causing the output power of the inverter to depend on a resistance value of the thermistor after the magnetron is started, and performs power up control for the switching element after a predetermined time from completion of the power down control.

Advantages of the Invention

According to the present invention, output is restored to a predetermined value while output control is performed for a predetermined time after release of the power down control in the high-frequency dielectric heating apparatus, so that it is made possible to prevent problem occurrence of the moding phenomenon, overshoot, etc., and improve the reliability and the usability of the high-frequency dielectric heating apparatus.

BRIEF DESCRIPTION OF THE DRAWINGS

FIG. 8A is a circuit diagram and FIG. 8B is a timing chart showing the operation of a comparator.

DESCRIPTION OF REFERENCE NUMERALS

| | |
|---|---|
| 7 | Radiation fin |
| 8 | IGBT |
| 9 | Thermistor |
| 10 | Inverter main circuit |
| 11 | Commercial power supply |
| 12 | Magnetron |
| 13 | Rectifier |
| 16 | Inverter |
| 18 | Boosting transformer |
| 20 | Voltage-doubling rectifier |
| 30 | Smoothing circuit |
| 36 | Resonance circuit |
| 100 | Magnetron drive control circuit |
| 161 | Inverter controller |

BEST MODE FOR CARRYING OUT THE INVENTION

Figure 1:
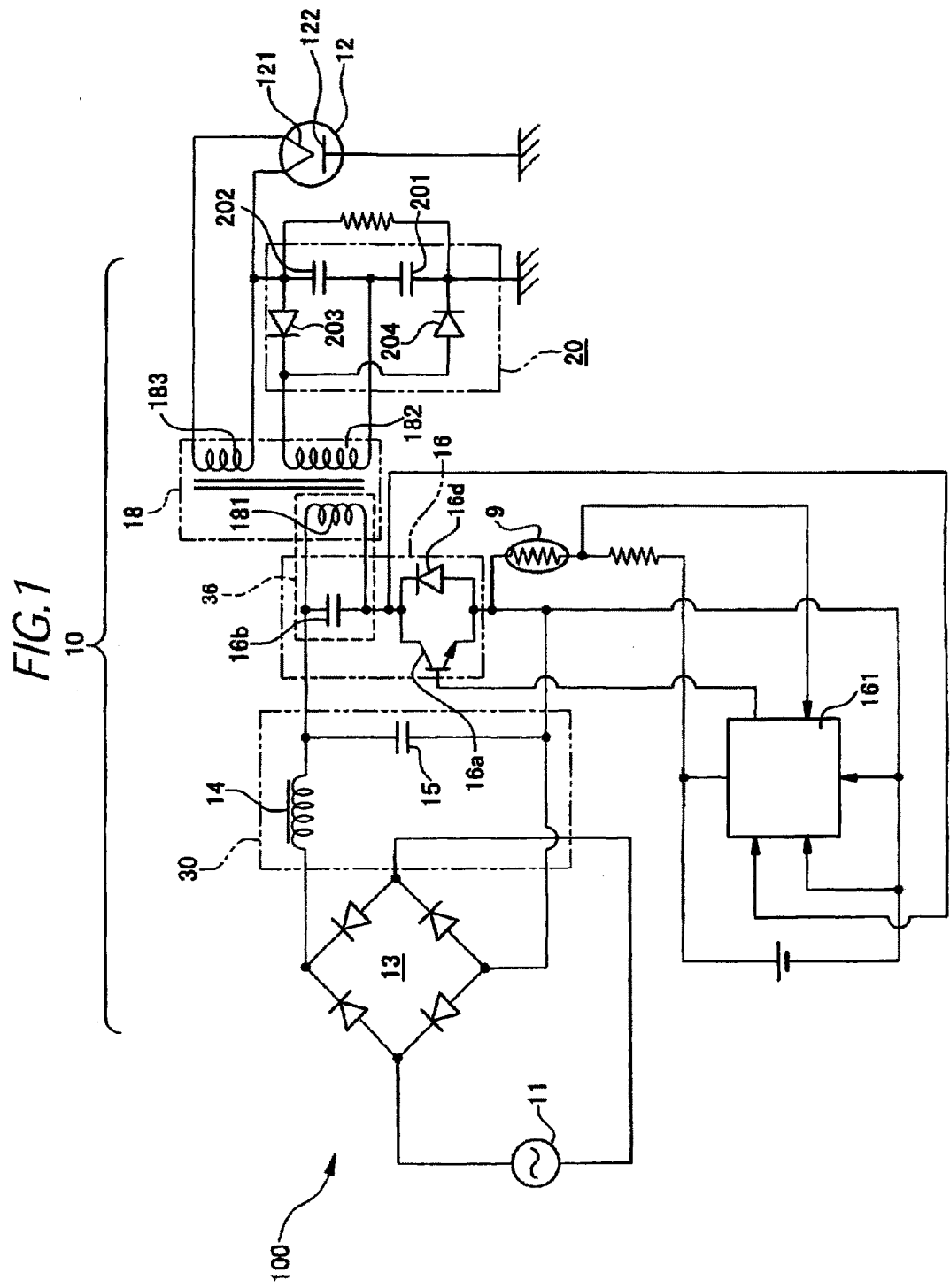
FIG. 1 is a block diagram of a high-frequency dielectric heating apparatus according to the present invention.

An embodiment of the present invention will be discussed below in detail with the accompanying drawings:

FIG. 1 is a block diagram of a high-frequency dielectric heating apparatus according to the present invention. A magnetron 12 for generating a microwave generates a microwave and heats an object to be heated such as food stored in a cabinet of a high-frequency dielectric heating apparatus such as a microwave oven. A magnetron drive control circuit 100 includes an inverter main circuit 10 for receiving supply of AC power from an AC power supply 11, a thermistor 9, and an inverter controller 161 for controlling the inverter main circuit 10, and the magnetron drive control circuit 100 performs drive control of the magnetron 12 for generating, stopping, and changing output of a microwave.

The inverter main circuit 10 supplies the AC power from the AC power supply 11 to the magnetron 12 and includes a rectifier 13 of diode bridge type, a smoothing circuit 30, an inverter 16, a boosting transformer 18, a resonance circuit 36, and a voltage-doubling rectifier 20.

Alternating current from the commercial power supply 11 is rectified to direct current by the rectifier 13 and the direct current is smoothed through a choke coil 14 on the output side of the rectifier 13 and a smoothing capacitor 15 (smoothing circuit 30) and is given to the input side of the inverter 16. The inverter 16 includes an IGBT (Insulated Gate Bipolar Transistor) 16a for switching direct current at high speed and a capacitor 16b and the direct current is converted into any desired high frequency (20 to 40 kHz) by turning on/off the IGBT 16a. The inverter 16 is driven by an inverter controller 161 described later for switching on/off electric current flowing through the primary side of the boosting transformer 18 at high speed.

In the boosting transformer 18, high-frequency voltage output by the inverter 16 is applied to a primary winding 181 and a high voltage responsive to the turns ratio is obtained at a secondary winding 182. A winding 183 with a smaller number of turns is provided on the secondary side of the boosting transformer 18 and is used to heat a filament (heater, cathode) 121 of the magnetron 12. The secondary winding 182 of the boosting transformer 18 is connected to a voltage-doubling rectifier 20 for rectifying output of the secondary winding and a high voltage is applied between the cathode 121 and an anode 122 for generating a microwave. The voltage-doubling rectifier 20 is made up of high voltage capacitors 201 and 202 and two high voltage diodes 203 and 204.

The resonance circuit 36 is implemented as a parallel circuit of the capacitor 16b and the primary winding 181 of the boosting transformer 18 and the primary winding 181 is assumed to be a part of the inverter 16, whereby the resonance circuit can be grasped as a component circuit of the inverter 16. A rectifying diode 16d is connected to the IGBT 16a in parallel; in the embodiment, the IGBT 16a and the rectifying diode 16d make up a switching element.

Figure 8A:
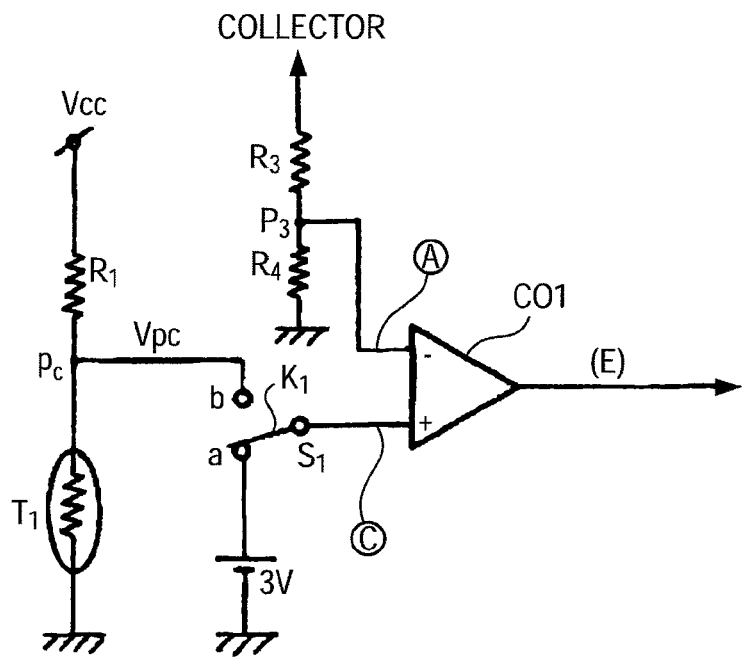
FIGS. 8A and 8B are drawings to describe a power down control system in the prior art.
Figure 8B:
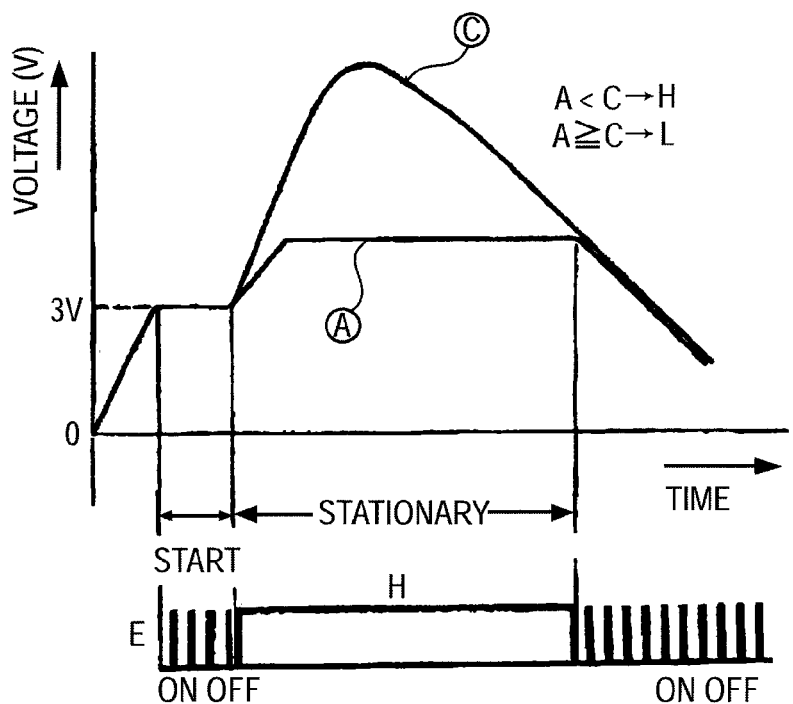

A thermistor 9 functions as a temperature detection section for detecting the temperature of the IGBT 16a and is attached to a leg part of the IGBT 16a or the proximity of the leg part according to a similar method to that in FIG. 8. As the thermistor 9, any of various types such as an NTC (negative temperature coefficient) thermistor with resistance decreasing with a temperature rise, a PTC (positive temperature coefficient) thermistor with resistance increasing with a temperature rise, or a CTR (critical temperature coefficient) thermistor with resistance abruptly decreasing when a predetermined temperature is exceeded can be used. In the embodiment, the NTC thermistor wherein the relationship between temperature and resistance value changes proportionally is used. The temperature detection section for detecting the temperature of the IGBT 16a is not limited to the thermistor and any of various devices can be used.

The inverter controller 161 switches on and off the IGBT 16a of the inverter 16 at high speed under the duty ratio set in PWM (Pulse Width Modulation) control and turns on and off electric current flowing through the primary side of the boosting transformer 18 at high speed.

In the configuration, a method of preventing thermal destruction of the IGBT 16a, so-called power down control of stopping or powering down before thermal destruction of the IGBT to prevent a temperature rise is executed by the inverter controller 161. An outline of the power down control is as follows:

(1) When the IGBT temperature reaches a detection temperature, first the power is decreased to a first predetermined value (for example, about a half) without suddenly turning off the power. Then, when the IGBT temperature lowers and falls below the detection temperature, again the power is restored to predetermined power and when the IGBT temperature rises and again reaches the detection temperature, again powering down is performed. This operation sequence is repeated for keeping the detection temperature.

(2) A given control width signal is always given from a microcomputer and in the inverter, the thermistor detects the temperature of the IGBT and sends a detection value to the inverter controller for controlling the inverter so as to lower the temperature of the IGBT.

(3) The thermistor is previously inserted into one of partial pressure circuits and gradual decrease control is performed based on the partial pressure ratio when the thermistor detects overheat temperature.

(4) When the gradual decrease control reaches at a certain point in time, the target value is largely decreased and this control is repeated. One cycle of the gradual decrease control is about one to two seconds at shortest. Such control is made possible by lessening a heat time constant as the chip thermistor is provided on the terminal back of the IGBT as described above.

Therefore, even when a foreign substance is caught in a fan for some reason and the fan abruptly stops, immediately cooking is stopped. In the configuration, however, attention is focused on the fact that thermal destruction of the IGBT does not easily occur if the fan fails, and cooking is allowed to continue. When the temperature of the IGBT rises and reaches a temperature before the temperature at which thermal destruction of the IGBT occurs, then the power is decreased to about a half and heating is allowed to continue. In such control, if the cooking is ordinarily performed, the user feels that warming is a little slow, and can be allowed to continue cooking without feelings of anxiety of a failure; mental anxiety can be circumvented.

Similar comments are also applied when the fan is locked; the heating operation can be allowed to continue at the minimum output to such an extent that the IGBT is not thermally destroyed without shutting down the power.

The power down control described above makes it possible to continue cooking under a given condition without suddenly stopping the cooking, and the usability of the high-voltage dielectric heating apparatus improves for the user. However, when the temperature later falls and the usual operating state is made possible, if the inverter controller again increases output of the magnetron, the moding phenomenon occurs and the inverter-control may stop. This is because if the output of the magnetron is increased from low output under the power down control to usual output, the filament becomes open or a state close to open and an overvoltage may be applied to the filament and its peripheral circuit.

Figure 2:
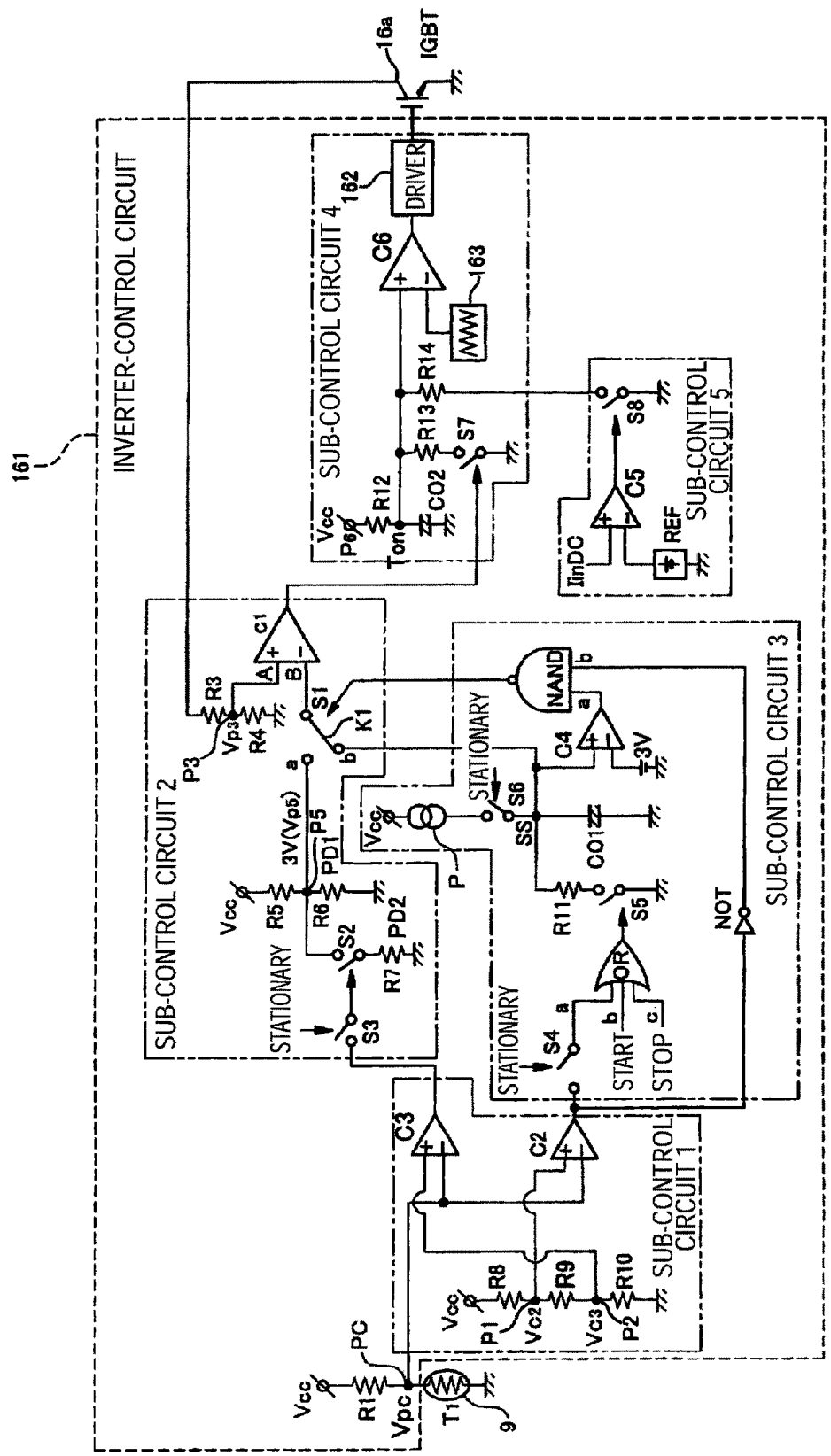
FIG. 2 is a circuit diagram of inverter controller used for the high-frequency dielectric heating apparatus according to the present invention.

FIG. 2 is a drawing to show the configuration of one embodiment of the inverter controller according to the present invention. The inverter controller 161 includes a sub-control circuit 1, a sub-control circuit 2, a sub-control circuit 3, a sub-control circuit 5, and a sub-control circuit 5. The sub-control circuits 1 to 3 are directly connected to each other, the sub-control circuit 2 is connected to the sub-control circuit 4, and the sub-control circuits 4 and 5 are connected to each other.

The sub-control circuit 1 includes comparators C2 and C3 and partial pressure resistors R8, R9, and R10. Potentials Vc2 and Vc3 of P1 and P2 points provided by dividing Vcc voltage using the partial pressure resistors R8, R9, and R10 (Vc2>Vc3) are input to positive terminals (+ terminals) of the comparators C2 and C3, and potential Vpc of a PC point provided by dividing Vcc voltage using the partial pressure resistor R1 and the thermistor T1 (reference numeral 9 in FIG. 1) is input to negative terminals (− terminals).

That is, the sub-control circuit 1 forms a temperature state output section for outputting a first state signal indicating the relative relationship between Vpc and Vc2 from the comparator C2 and a second state signal indicating the relative relationship between Vpc and Vc3 from the comparator C3 in response to Vpc of an output value of the thermistor T1. Since Vc2 and Vc3 differ from each other, the first state signal and the second state signal become signals indicating different temperature states of the thermistor T1 from each other.

The sub-control circuit 2 includes a (changeover) switch S1, switches S2 and S3, partial pressure resistors R3, R4, R5, and R6, a ground resistor R7, and a comparator C1. Potential Vp3 of a P3 point between the partial pressure resistors R3 and R4 is input to a positive terminal A of the comparator C1, and a voltage signal from the switch S1 is input to a negative terminal B. The changeover switch S1 includes a moving contact K1 and is switched to either of a first fixed terminal a and a second fixed terminal b in response to a signal from a NAND gate circuit of the sub-control circuit 3 described later. In this case, the potential Vp3 is potential reflecting the collector voltage of the IGBT 16a and the sub-control circuit 2 fluctuates the collector-emitter voltage of the IGBT 16a together with the sub-control circuits 4 and 5 described later; the collector-emitter voltage is equal to a resonance voltage occurring in the resonance circuit 36. Therefore, the sub-control circuit 2 functions as a voltage fluctuating section (output fluctuating unit) for fluctuating the resonance voltage occurring in the resonance circuit 36 by the action of the moving contact K1, etc., and in cooperation with the sub-control circuits 4 and 5 described later.

Potential Vp5 of a P5 point provided by dividing Vcc voltage using the partial pressure resistors R5 and R6, here 3 V, is input to the first fixed terminal a. Further, when the switch S2 is turned on (closed), the ground resistor R7 is connected to P5 in parallel and a divided voltage signal is input to P5. Turning on/off (opening/closing) the switch S2 is controlled by an electric signal when the switch S3 connected to the comparator C3 of the sub-control circuit 1 is on. The switch S3 is turned on (closed) in the stationary state of the magnetron.

The sub-control circuit 3 includes the NAND gate circuit, a comparator C4, an electrolytic capacitor CO1, a resistor R11, switches S4, S5, and S6, an OR gate circuit, a NOT gate circuit, and a current source P. As described above, output of the NAND gate circuit is input to the moving contact K1 of the changeover switch S1 of the sub-control circuit 2. On the other hand, output of the comparator C4 is input to a first input terminal a of the NAND gate circuit and output of the NOT gate circuit for inverting output of the comparator C2 is input to a second input terminal b. Reference potential of 3 V is input to a negative terminal of the comparator C4. On the other hand, a voltage signal of an SS point between the current source P and the switch S6 connected to the Vcc voltage and the electrolytic capacitor CO1 is input to a positive terminal of the comparator C4. A signal from the switch S5 opened or closed according to output from the OR gate circuit is input to the SS point through the resistor R11 and further the SS point is connected to the current source P through the switch S6. The OR gate circuit has three input terminals a, b, and c and a signal from the switch S4 to which a signal of the comparator C2 of the sub-control circuit 1 is input is input to the first input terminal a. "Start" and "Stop" signals are input to the second input terminal b and the third input terminal c, respectively. The switches S4 and S6 are on in the stationary state of the magnetron.

In the example, "start" and "stationary state (stationary operation)" of the magnetron are distinguished from each other depending on whether or not the input current to the magnetron, namely, mainly the current of the inverter main circuit 10 is detected and exceeds a predetermined threshold value. That is, if linDC of a voltage value into which the current of the inverter main circuit 10 is converted exceeds a predetermined threshold value, the inverter controller 161 determines that the operation state of the magnetron has made a transition from "start" to "stationary state," and switches on the switches S3, S4, and S6. A method of distinguishing "start" and "stationary state" of the magnetron from each other is not limited to the method based on the input current. For example, a method of detecting an anode current on the secondary side is also available.

The sub-control circuit 4 includes a driver circuit 162, a comparator C6, a saw tooth wave generation circuit 163, resistors R12, R13, and R14, a switch S7, and an electrolytic capacitor CO2. Potential Ton of a point P6 between the resistor R12 connected to the Vcc voltage and the grounded electrolytic capacitor CO2 is a voltage for determining the on width (on duty) of the IGBT 16a. The resistors R13 and R14 and a positive terminal of the comparator C6 are connected to the point P6 in parallel. The switch 7 is connected to the resistor R13 in series; turning on/off (opening/closing) the switch S7 is controlled by output of the comparator C1 of the sub-control circuit 2. Output of the saw tooth wave generation circuit 163 is input to a negative terminal of the comparator C6. Output of the comparator C6 is input to the driver circuit 162. The driver circuit 162 is connected to a base of the IGBT 16a and drives the IGBT 16a in accordance with an input signal from the comparator C6. A collector of the IGBT 16a is connected to the P3 point between the resistors R3 and R4 of the sub-control circuit 2.

The sub-control circuit 5 includes a switch S8, a comparator C5, and a reference potential generation circuit REF. The switch S8 is connected to the resistor R14 of the sub-control circuit 4. linDC of a voltage into which the input current to the inverter main circuit 10 is converted is input to a positive terminal of the comparator C5, and REF potential of the reference potential of linDC is input to a negative terminal. Turning on/off (opening/closing) the switch S8 is controlled in accordance with output of the comparator C5.

Figure 3:
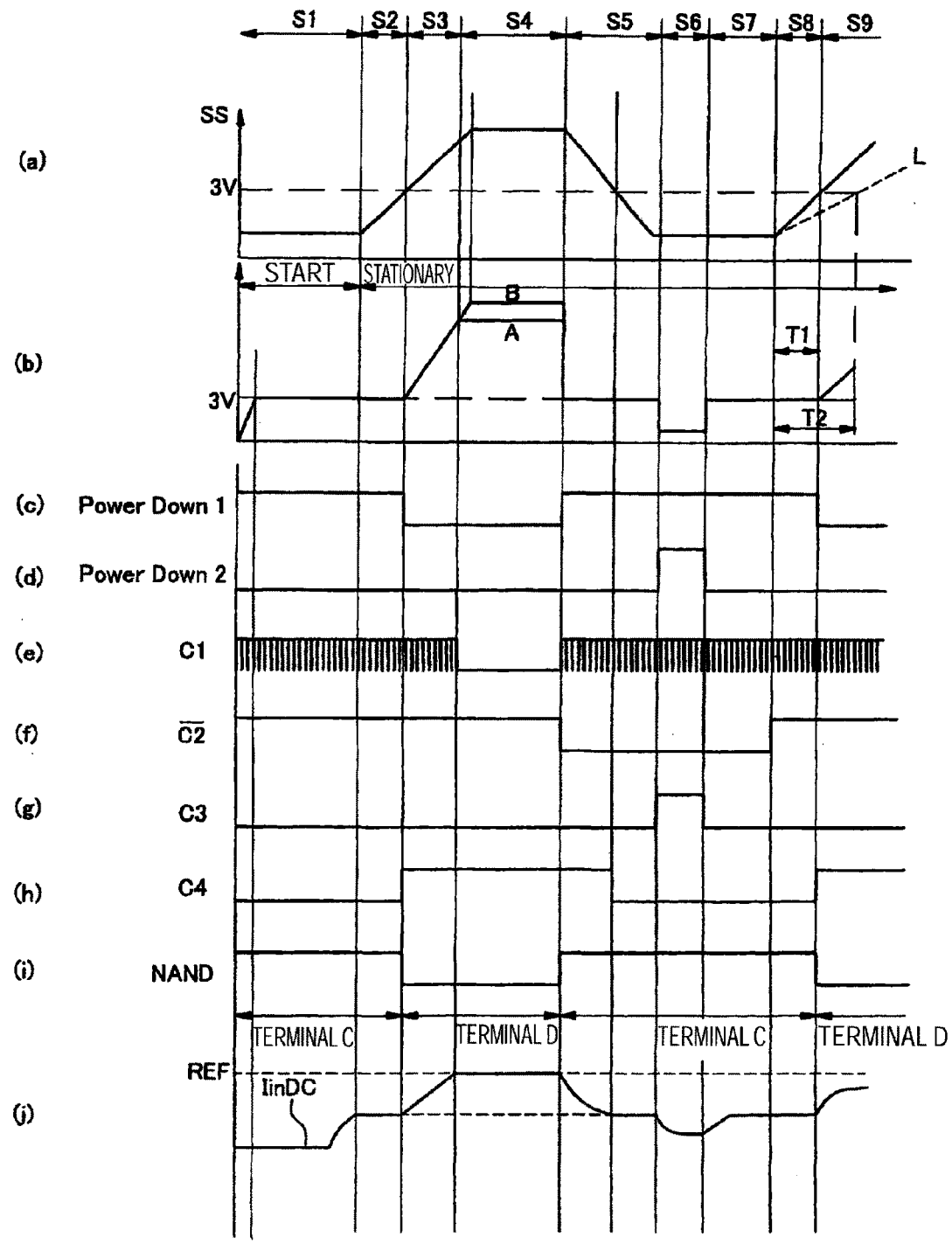
FIG. 3 is a timing chart to show the operation of the inverter controller according to the present invention.

FIG. 3 is a timing chart to describe the operation of the inverter controller 161. The horizontal axis represents the time and is divided into nine steps of steps S1 to S9. Step S1 corresponds to a step at the starting time of the magnetron 12 and steps S2 to S9 correspond to steps at the stationary state time of the magnetron 12. The vertical axis represents the operation state of each part of the inverter controller; it shows (a) potential at SS point, (b) input voltage to the positive terminal A and the negative terminal B of the comparator C1, (c) on and off of power down control PD (Power Down) 1 based on brownout effect of the resistor R6, (d) on and off of power down control PD 2 based on brownout effect of the resistor R7, (e) output of the comparator C1, (f) inversion output of the comparator C2 (negation of C2 output; the overline of C2 means inversion of C2, namely, output of the NOT gate circuit), (g) output of the comparator C3, (h) output of the comparator C4, (i) output of the NAND gate circuit, and (j) voltage of linDC in order from the top to the bottom. The operation of the inverter controller 161 will be discussed below with FIGS. 2 and 3:

(1) Step S1 (At the Magnetron Starting Time)

To begin with, at the starting time when the magnetron 12 starts to operate, the temperature of the IGBT 16a is low and therefore the temperature of the thermistor T1 is also low and thus the resistance of the thermistor T1 is comparatively high (the thermistor T1 is implemented as an NTC thermistor with resistance decreasing with a temperature rise) and therefore the potential Vpc is high. Thus, the comparator C3 for making a comparison between the potential Vpc and the potential Vc3 outputs "0 (Low)" and inversion output of C2 provided through the NOT gate circuit from output of the comparator C2 becomes "1 (Hi)" (S1 in FIGS. 3 (f) and (g)). At this time, the switches S3 and S4 are off.

Since the switches S6 and S5 are also off, the potential at the SS point remains low (S1 in FIG. 3 (a)) and by comparing with the reference potential 3 V on the negative terminal side, the comparator C4 outputs "0" (S1 in FIG. 3 (h)).

In the NAND gate circuit, "0" is input to the first input terminal a and "1" is input to the second input terminal b and thus the NAND gate circuit outputs "1" (S1 in FIG. 3 (i)). If the NAND gate circuit outputs "1 (Hi)," the moving contact K1 of the changeover switch S1 of the sub-control circuit 2 is switched to the side of the first fixed terminal a and if the NAND gate circuit outputs "0 (Low)," the moving contact K1 is switched to the side of the second fixed terminal b. Therefore, the moving contact K1 of the changeover switch S1 is set to the side of the first fixed terminal a.

The switch S3 is off and the potential Vp5 of the P5 point (3 V) provided by dividing voltage using the partial pressure resistors R5 and R6 is input to the negative terminal of the comparator C1. On the other hand, the potential Vp3 of the point P3 provided by dividing the collector voltage of the IGBT 16a using the partial pressure resistors R3 and R4 is input to the positive terminal of the comparator C1. Vp3 is a divided voltage of the collector voltage and repeatedly exceeds and falls below 3 V of Vp5 by the action of the resonance voltage of the resonance circuit 36 of the inverter 16. Therefore, the comparator C1 outputs on and off repeatedly in such a manner that it outputs off when the potential at the point P3 is smaller than 3 V and outputs on when the potential becomes higher than 3 V (S1 in FIG. 3 (e)) and this information is input to the IGBT 16a through the sub-control circuit 4. Since the on/off duty of the IGBT 16a is controlled so that the P3 potential roughly matches 3 V, the collector voltage of the IGBT 16a at the starting time becomes lower than that at the stationary time.

(2) Steps S2 to S4 (Transition From Start of Magnetron to Stationary State)

When the operation state of the magnetron becomes stationary, the switches S3, S4, and S6 are turned on. Then, charge storage from the current source P through the switch S6 to the electrolytic capacitor CO1 starts and the potential at the SS point starts to rise (S2 in FIG. 3 (a)). When the potential at the SS point exceeds 3 V, by comparing with the reference potential 3 V on the negative terminal side, the comparator C4 outputs "1" and "1" is input to the first input terminal a of the NAND gate circuit (S3 in FIG. 3 (h)). On the other hand, input to the second input terminal b remains "1." Therefore, the NAND gate circuit outputs "0" (S3 in FIG. 3 (i)) and the moving contact K1 of the changeover switch S1 is set to the side of the second fixed terminal b. At this time, PD1 of the resistor R6 is turned off (S3 in FIG. 3 (c)). That is, if the magnetron enters the stationary state, PD1 works for suppressing occurrence of the moding phenomenon until the potential at the SS point reaches 3 V.

The potential at the SS point continues to rise by the action of the current source P (S3 in FIG. 3 (a)) and as the input voltage to the negative terminal B of the comparator C1, a high potential as compared with 3 V at the starting time is input. Therefore, the on duty of the on/off control of the IGBT 16a is enhanced so that the P3 potential roughly matches the SS potential, the collector voltage of the IGBT 16a also becomes high, and the input voltage to P3, the positive terminal A, divided voltage of the collector voltage, also rises (S3 in FIG. 3 (b)). This means that the on duty of the on/off control is enhanced depending on the rise inclination of the SS potential. That is, the sub-control circuit 3 raises the SS potential and shoulders stationary transition control at the time of making a transition from the start of the magnetron to the stationary state.

When the input voltage to the positive terminal A, the negative terminal B becomes equal to or greater than a predetermined value, namely, the on duty of the on/off control of the IGBT 16a becomes equal to or greater than a predetermined value, a power control function of the sub-control circuit 5 is activated and a limitation is imposed on the rise in the on duty. That is, the limitation is imposed, whereby the SS potential always becomes higher than the P3 potential and thus the comparator C1 outputs off and the on duty is controlled by the sub-control circuit 5. The power control function is as follows: The comparator C5 makes a comparison between linDC of a voltage into which the input current is converted and the REF potential of the reference potential of linDC and when linDC exceeds the REF potential, the comparator C5 generates a signal for turning on the switch S8 and the on duty is controlled, whereby the power control function is accomplished (S4 in FIG. 3 (j)). Thus, if the SS potential becomes higher than the P3 potential, only the sub-control circuit 5 controls the on duty, so that it is made possible to impose a limitation on the rise in the on duty, and safety can be secured.

(3) Step S5 (Power Down Control of Magnetron)

The IGBT 16a is heated with the passage of time under the safe operation described above and the temperature of the thermistor T1 also rises with the temperature rise of the IGBT 16a and the resistance value decreases. When the cooling performance is poor or a foreign substance is caught in a fan for some reason and the fan abruptly stops, etc., the resistance value further decreases and the potential Vpc of the point PC starts to fall. If the potential Vpc becomes lower than Vc2 (for example, 3.8 V) of another input potential of the comparator C2 (Vpc<Vc2), the comparator C2 outputs "1."

When the comparator C2 outputs "1," inversion output of C2 provided through the NOT gate circuit from output of the comparator C2 becomes "0" (S5 in FIG. 3 (f)). Therefore, "1" and "0" are input to the two input terminals a and b of the NAND gate circuit and the NAND gate circuit outputs "1" (S5 in FIG. 3 (i)) and the moving contact of the changeover switch S1 moves from the second fixed terminal b to the side of the first fixed terminal a.

At this time, the input voltage to the positive terminal A, the negative terminal B of the comparator C1 is rapidly lowered to 3 V independently of the potential at the SS point and is maintained at 3 V (S5 in FIG. 3 (b)). Thus, the power down control (PD1) works. This means that the comparator C1 outputs on and off repeatedly (S5 in FIG. 3 (e)) at the same time as the potential Vpc becomes lower than Vc2 of another input potential of the comparator C2 (Vpc<Vc2).

When the comparator C2 outputs "1," the switch S5 is turned on through the switch S4 and output "1" of the OR gate circuit and the charge of the electrolytic capacitor CO1 is allowed to flow into the ground through the resistor R11 and the potential at the point SS starts to fall (S5 in FIG. 3 (a)). If the potential at the point SS falls below 3 V (middle of S5 in FIG. 3 (a)), the comparator C4 outputs "0" (S5 in FIG. 3 (h)). At this point in time, however, even if the output of the comparator C4 changes from "1" to "0," the output of the NAND gate circuit is not affected. Lowering the SS potential is resetting the stationary transition control that the sub-control circuit 3 shoulders, used at the time of making a transition from the start to the stationary state.

(4) Step S6 (Continuation of Power Down Control)

If the temperature of the thermistor T1 further rises, the resistance value of the thermistor T1 decreases and the potential Vpc of the point PC also lowers and when the potential becomes lower than Vc3 (for example, 2.9 V) of another input potential of the comparator C3 (Vpc<Vc3), the comparator C3 outputs "1" (S6 in FIG. 3 (g)). In the stationary state, S2 is turned on through the switch S3 already turned on and further PD2 of the resistor R7 is turned on (S6 in FIG. 3 (d)) and the input voltage to the positive terminal A, the negative terminal B of the comparator C1 further lowers from 3 V and further the power down control (PD2) works (S6 in FIG. 3 (b)).

(5) Step S7 (Power Down Control Release)

When the temperature of the thermistor T1 again falls by the power down control PD2, the resistance value of the thermistor T1 increases and the potential Vpc at the point PC also rises and when the potential becomes higher than Vc3 of another input potential of the comparator C3 (Vpc>Vc3), the comparator C3 outputs "0" (S7 in FIG. 3 (g)). In association with this, the switch S2 is turned off and the PD2 of the resistor R7 is turned off (S7 in FIG. 3 (d)) and thus the input voltage to the positive terminal A, the negative terminal B of the comparator C1 is again restored to 3 V (S7 in FIG. 3 (b)).

(6) Step S8 (Usual Operation Start)

When the temperature of the thermistor T1 further falls, the resistance value of the thermistor T1 increases and the potential Vpc at the point PC also starts to rise. When the potential Vpc becomes higher than Vc2 (for example, 3.8 V) of another input potential of the comparator C2 (Vpc>Vc2), the comparator C2 outputs "0" (inversion output of C2 becomes "1" as in S8 in FIG. 3 (f)). Then, the switch S5 turned on in the power down control is turned off through the switch S4 and the OR gate circuit and the partial pressure action of the resistor R11 does not work. The potential at the point SS starts to rise (S8 in FIG. 3 (a)) with charge storage in the electrolytic capacitor CO1. Since the potential at the point SS does not reach 3 V, the moving contact K1 of the changeover switch S1 is on the side of the fixed terminal a and the switch S2 is also off and thus the PD1 control still works (S8 in FIG. 3 (c)).

(7) Step S9 (Output Rise After Usual Operation Start)

When the potential at the point SS continues to rise and exceeds 3 V (S9 in FIG. 3 (a)), the comparator C4 outputs "1" (rise signal described later), the NAND gate circuit outputs "0," and the moving contact K1 is switched to the side of the second fixed terminal b (S9 in FIG. 3 (i)). The input voltage to the positive terminal A, the negative terminal B of the comparator C1 start to rise while depending on the rise inclination of the SS potential (S9 in FIG. 3 (b)).

As described above, in the present invention, the sub-control circuit 3 containing the NAND gate circuit, the comparator C4, and the electrolytic capacitor CO1 is provided at the preceding stage of the negative terminal B of the comparator C1. When the potential at the SS point on the negative terminal side of the comparator C4 exceeds 3 V, then (the NAND gate circuit outputs "0 and) the moving contact K1 of the changeover switch S1 moves to the side of the second fixed terminal b and the input voltage to the positive terminal A, the negative terminal B of the comparator C1 start to rise. The time delay from rise start of the potential at the SS point to reaching 3 V (S8 in FIG. 3) is realized by the storage action of the electrolytic capacitor CO1. That is, at the stationary state time, the potential at the SS point starts to rise with a signal (first state signal) from the comparator C2 as a trigger and the sub-control circuit 3 functions as an output increase delay section (output increase suppressing unit) for outputting a rise signal for raising the input voltage to the IGBT 16a to the comparator C1 after a predetermined time (S8) until the potential exceeds 3 V. The output increase delay section is also used for the stationary transition control at the time of making a transition from the start to the stationary state and the control system is reset and is again used, so that output increase suppressing control can be easily performed. That is, the SS potential is once lowered at the power down time using the thermistor, whereby the sub-control circuit 3 as the output increase delay section shoulders not only the stationary transition control at the time of making a transition from the start to the stationary state, but also the output increase suppressing control. In the configuration described above, the stationary transition control is reset and is again used, but the stationary transition control and the output increase suppressing control may be performed using different control circuits, of course.

According to the configuration described above, it is made possible to delay rise in the input voltage to the positive terminal A, the negative terminal B of the comparator C1 for a predetermined time after the power down control is released at step S7 as shown in steps S8 and S9 in FIGS. 3 (a) and (b). That is, in the present invention, to restore the output of the magnetron to a predetermined value, the output is restored to the predetermined value while output control is performed for a predetermined time, so that it is made possible to prevent problem occurrence of the moding phenomenon, overshoot, etc., and improve the reliability and the usability of the high-frequency dielectric heating apparatus.

The duration of the time delay (S8 in FIG. 3) described above is realized by the storage action of the electrolytic capacitor CO1 and thus can be adjusted by changing the time constant of the electrolytic capacitor CO1. For example, the SS change inclination is small on a dotted line L in FIG. 3, which means that the time constant of the electrolytic capacitor CO1 is larger, and original delay time T1 grows to T2 as shown in FIG. 3 (b).

Since the time constant changes in response to the electrostatic capacitance of the electrolytic capacitor CO1, for example, the electrolytic capacitor CO1 having an appropriate time delay can be adopted in response to the use of the inverter controller and the high-frequency dielectric heating apparatus. A variable capacitor capable of varying electrostatic capacitance is adopted in the portion of the electrolytic capacitor, whereby it is made possible to change the time delay in response to a scene.

Figure 4:
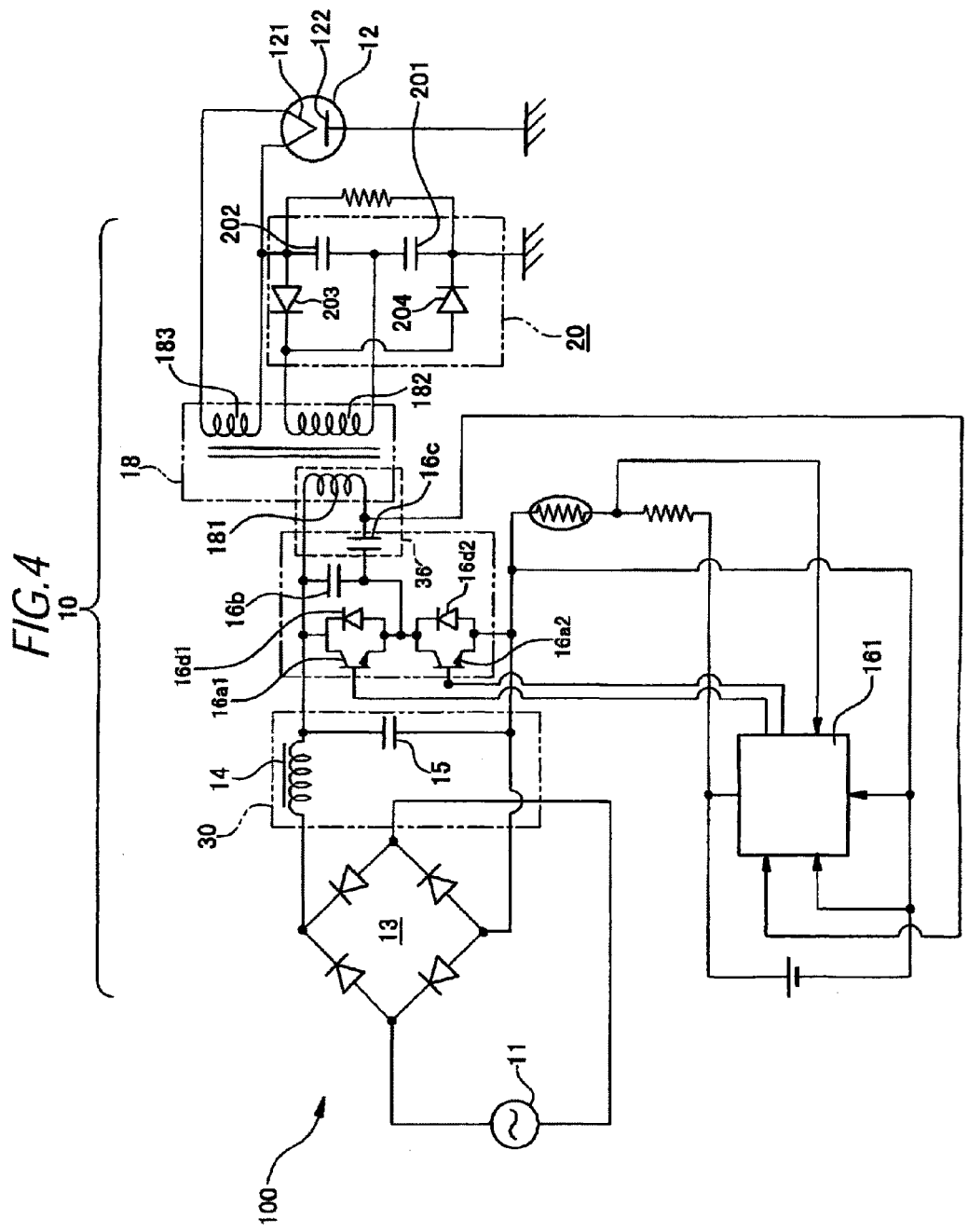
FIG. 4 is a block diagram of another embodiment of the high-frequency dielectric heating apparatus according to the present invention.

FIG. 4 is a block diagram of another embodiment of the high-frequency dielectric heating apparatus. In the embodiment in FIG. 1, the inverter controller is applied to the control system of the collector-emitter voltage of the IGBT 16a of the switching element (equal to the resonance voltage of the resonance circuit). However, the inverter controller of the present invention can also be applied to the magnetron drive control circuit for controlling the resonance voltage of a series resonance circuit as shown in FIG. 4.

In the embodiment, in an inverter 16, a snubber capacitor 16b for suppressing the resonance voltage of a resonance circuit 36 is newly provided in parallel with a capacitor 16c and a primary winding 181 connected in series (resonance circuit 36). A switching element using an IGBT 16a1, an IGBT 16a2, and a diode 16d1 (16d2) in combination is provided in the inverter 16 and a power supply clamp circuit with driver circuits input to gates (namely, two driver circuits) is provided. In the embodiment, the resonance voltage of the resonance circuit 36 made up of the capacitor 16c and the primary winding 181 of a boosting transformer 18 is controlled. That is, a division voltage of the resonance voltage occurring in the resonance circuit 36 is Vp3 in FIG. 2 and is connected, whereby the resonance voltage is controlled in a similar manner.

Figure 5:
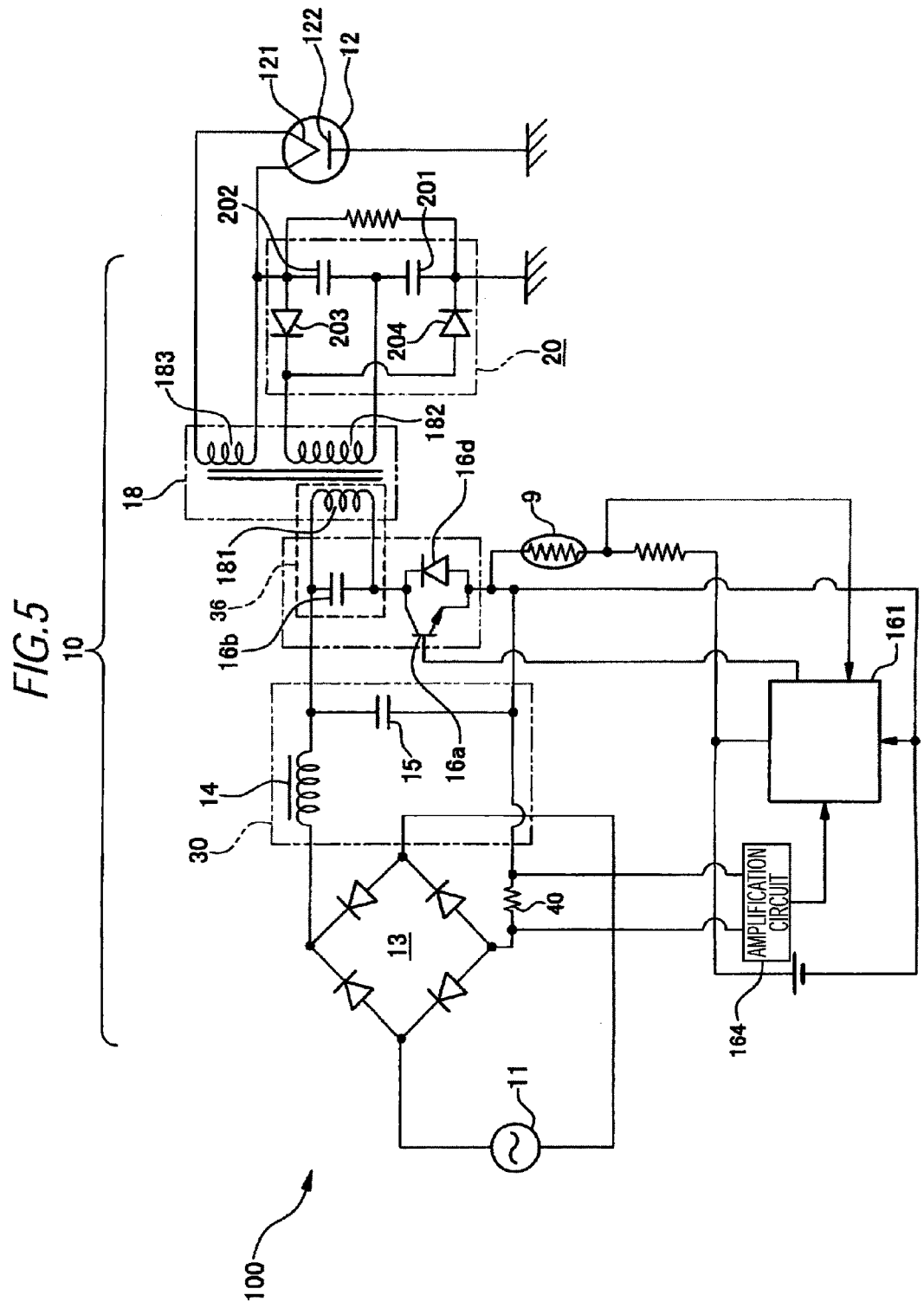
FIG. 5 is a block diagram of further another embodiment of the high-frequency dielectric heating apparatus according to the present invention.
Figure 6:
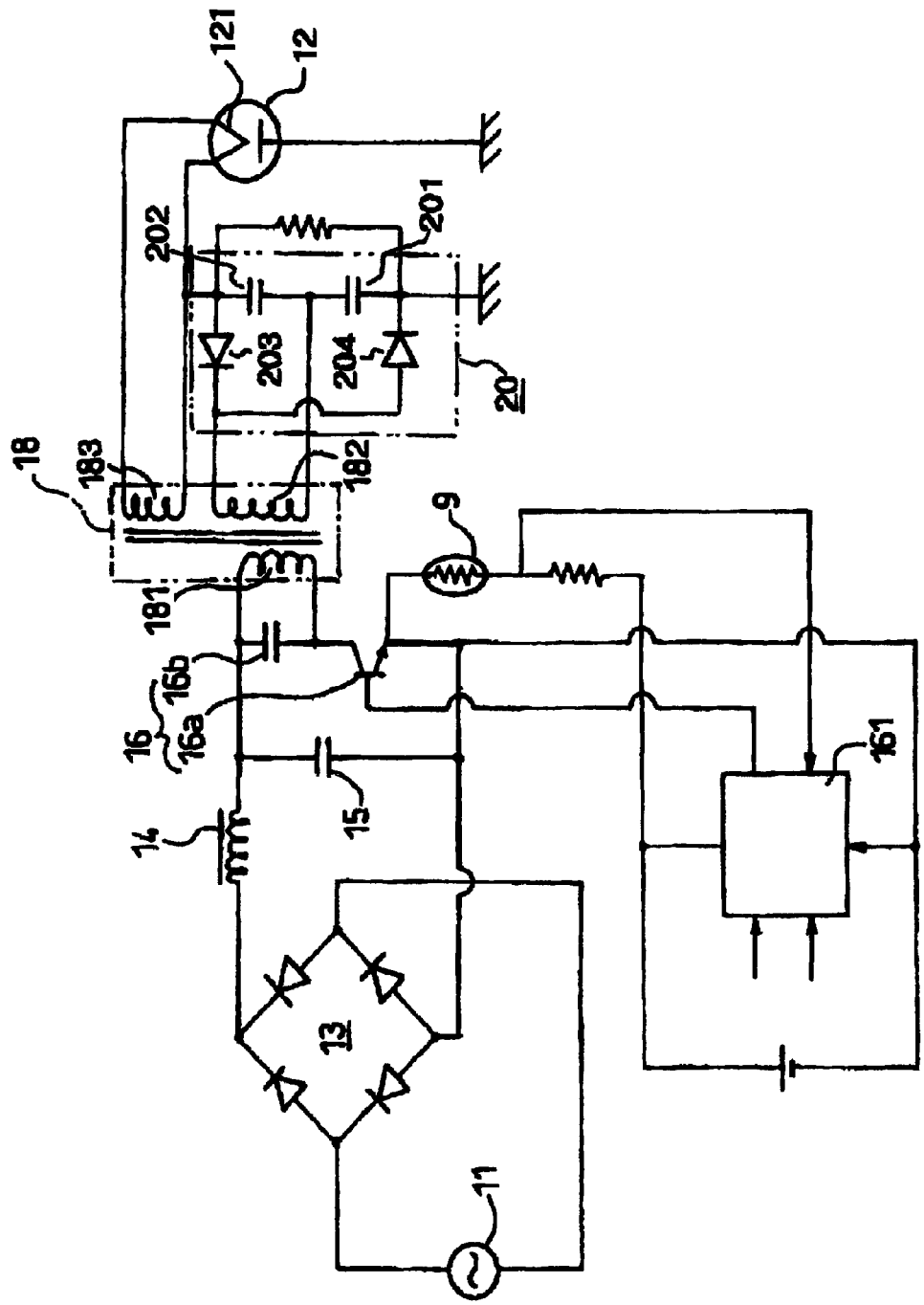
FIG. 6 is a block diagram of a high-frequency dielectric heating apparatus in a prior art.
Figure 7:
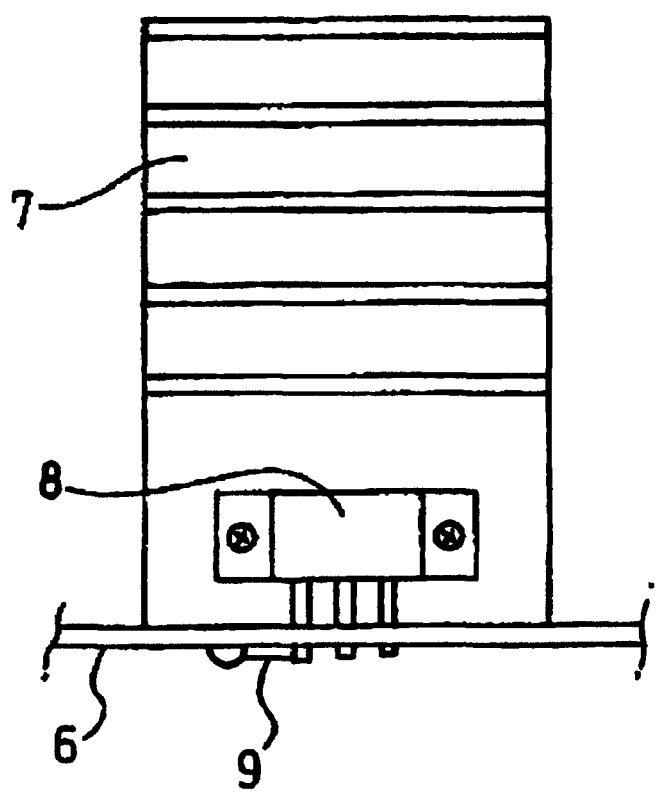
FIG. 7 is a drawing of the periphery of a radiation fin.

FIG. 5 is a block diagram of further another embodiment of the high-frequency dielectric heating apparatus. The inverter controller of the present invention can also be applied to a magnetron drive control circuit for detecting input current to an inverter in place of the collector-emitter voltage of an IGBT 16a using a shunt resistor 40 at the preceding stage of an inverter 16 and a smoothing circuit 30 and controlling the duty of the IGBT 16a, as shown in FIG. 5. Current detection means such as a CT (Current Transformer) in place of the shunt resistor may be used to detect the input current. To detect the input current, an amplifier (operational amplifier)

164 needs to be provided at the preceding stage of the inverter controller 161. Output of the amplifier is input in place of Vp3 in FIG. 2, thereby controlling the input current.

This application is based on Japanese Patent Application (No. 2006-169052) filed on Jun. 19, 2006, the contents of which are incorporated herein by reference.

While the embodiments of the present invention have been described, it is to be understood that the present invention is not limited to the items disclosed in the embodiments and the present invention also intends that those skilled in the art make changes, modifications, and application based on the Description and widely known arts, and the changes, the modifications, and the application are also contained in the scope to be protected.

INDUSTRIAL APPLICABILITY

According to the present invention, it is made possible not only to improve the usability of a high-voltage dielectric heating apparatus by power down control, but also to prevent occurrence of a defect of the moding phenomenon, etc., accompanying the later magnetron output rise and further improve the reliability of the high-voltage dielectric heating apparatus.

The invention claimed is:

1. An inverter controller for controlling an inverter which converts direct current into alternating current of a predetermined frequency, and includes a resonance circuit for fluctuating output of a predetermined object to be controlled, the inverter controller comprising:
    an output fluctuating unit which fluctuates output of the inverter in response to an output value of a temperature detection section which detects a temperature of a switching element of the inverter; and
    an output increase suppressing unit which suppresses an increase in the output of the inverter for a predetermined time after decrease control in the output of the inverter performed by the output fluctuating unit, wherein
    the output increase suppressing unit also performs stationary transition control at the time of making a transition from start of the expect to be controlled to a stationary state.

2. The inverter controller as claimed in claim 1, wherein the inverter controller controls resonance voltage of the resonance circuit.

3. A high-frequency dielectric heating apparatus comprising the inverter controller as claimed in claim 1, and further comprising:
    a magnetron which generates a microwave as the object to be controlled; and
    the inverter.

4. An inverter controller for controlling an inverter which converts direct current into alternating current of a predetermined frequency, and includes a resonance circuit for fluctuating output of a predetermined object to be controlled, the inverter controller comprising:
    an output fluctuating unit which fluctuates output of the inverter in response to an output value of a temperature detection section which detects a temperature of a switching element of the inverter; and
    an output increase suppressing unit which suppresses an increase in the output of the inverter for a predetermined time after decrease control in the output of the inverter performed by the output fluctuating unit, wherein
    the output increase suppressing unit includes a capacitor for storing charge for a predetermined time to suppress the increase in the output of the inverter performed by the output fluctuating unit.

5. The inverter controller as claimed in claim 4, wherein the output increase suppressing unit promptly activates the decrease control in the output of the inverter independently of a time constant of the capacitor at the decrease control in the output of the inverter.

6. The inverter controller as claimed in claim 4, wherein the output fluctuating unit increases the output of the inverter in response to potential of the capacitor after the output increase suppressing unit suppresses the increase in the output of the inverter for predetermined time.

7. The inverter controller as claimed in claim 4, wherein the inverter controller controls resonance voltage of the resonance circuit.

8. A high-frequency dielectric heating apparatus comprising the inverter controller as claimed in claim 4, and further comprising:
    a magnetron which generates a microwave as the object to be controlled; and
    the inverter.

* * * * *